June 23, 1970        B. F. SKINNER        3,516,177

TEACHING DEVICE WITH INVISIBLE ANSWER INDICATOR

Filed Feb. 14, 1968

INVENTOR.
BURRHUS F. SKINNER
BY Bair, Freeman
& Molinare ATTORNEYS

United States Patent Office 3,516,177
Patented June 23, 1970

3,516,177
TEACHING DEVICE WITH INVISIBLE ANSWER INDICATOR
Burrhus F. Skinner, Cambridge, Mass., assignor to Meredith Corporation, a corporation of Iowa
Filed Feb. 14, 1968, Ser. No. 705,549
Int. Cl. G09b 3/08
U.S. Cl. 35—9                            17 Claims

ABSTRACT OF THE DISCLOSURE

A teaching device for students which includes a worksheet with a number of questions thereon. Adjacent each question are possible answers, and adjacent each answer is an outline in which the student may scribe a mark with a marking pen. Outlines which correspond to a correct answer include a vertical, invisible ink mark passing therethrough. This mark is activated by visible ink from the marking pen and appears as a different color from the visible ink. Since only those outlines corresponding to correct answers contain the invisible marks, a student who scribes a line through the outline corresponding to the correct answer activates the invisible ink and receives an immediate indication that the answer is correct. To prevent cheating, the invisible ink marks are positioned in different portions of each outline. In an alternative arrangement, the outlines are completely filled with invisible ink; however, correct answers are indicated by the absence of invisible ink from certain small areas within the outline.

BACKGROUND OF THE INVENTION

This invention relates to a teaching device for students, and more particularly, relates to a teaching device adapted to prevent cheating.

Teaching machines and other means to aid in the education of students are currently undergoing rapid development due to the technology explosion. Indicative of the new methods and devices now being developed are the methods and devices for teaching writing skills disclosed in the application of Skinner and Ostashever, Ser. No. 512,882, filed Dec. 10, 1965, now Pat. No. 3,363,337 issued Jan. 16, 1968; Skinner and Ehrlich, Ser. No. 512,883, filed Dec. 10, 1965 now Pat. No. 3,363,338 issued Jan. 16, 1968; and Skinner, Ser. No. 512,842, filed Dec. 10, 1965, now Pat. No. 3,363,336 issued Jan. 16, 1968.

These applications are all related to the concept of using invisible ink in combination with visible ink on a worksheet to aid in teaching various skills to a student. In general, these disclosures provide for a worksheet having areas thereon which are printed in an invisible ink. A marker pen is filled with another ink which leaves a visible mark on the worksheet. The visible ink is also adapted to react with the invisible ink to produce a color different than the color on the untreated areas. In this manner a student is enabled to check his markings with the desired markings printed in invisible ink and activated by the marker pen on the worksheet.

Besides teaching a student to draw, write, or mark, the visible and invisible ink combination on a worksheet may be used for multiple choice and true-false type quizzes. For example, invisible ink may be printed on a worksheet in an enclosed outlined area corresponding with the correct answer. A student who marks within the outlined area knows immediately whether he has correctly or incorrectly answered the question because of the invisible ink reaction or nonreaction.

However, such a utilization of visible and invisible inks on a worksheet does not provide a foolproof method for preventing a student from cheating. A student may, for example, use the tip of his writing instrument to place a very small dot in the answer box to determine if the area within the answer box contains reactive invisible ink. Either because the teacher did not observe the dot or because the dot could be said to have been the result of a slip of the hand, or perhaps, ink dropping off of the end of the writing instrument, the teacher when checking the answers on a worksheet would probably ignore the small dot even though the dot might mean a searching but incorrect choice by the student. In the "anti-cheat" worksheet here described, only a small part of the correct area indicates a right answer and the chances that the student will touch this area without leaving a conspicuous mark are small.

SUMMARY OF THE INVENTION

In a principal aspect the present invention of a teaching device for students comprises a worksheet having outlined areas thereon in which there may be invisible ink markings that are activated by means for writing on the worksheet. The outlines correspond to those possible choices given a student in response to a question.

The invisible ink markings within certain outlines indicate answers which are consistent with each other, for example, correct or incorrect. The invisible ink markings within these outlines do not fill the entire area within these outlines and are placed in different portions of the area within each outline. In this manner a student cannot pretest a certain outlined area with his writing or marking instrument without leaving a conspicuous record since the chance of hitting an invisibly inked portion of the area is small. In order to insure that he properly pretested an outline area the student would necessarily be obliged to scribe through much of the outlined area.

It is thus an object of the present invention to provide a teaching device with an invisible ink answer indicator.

It is a further object of the present invention to provide a teaching device which substantially eliminates the opportunity for students to cheat.

Still another object of the present invention is to provide a teaching device for students which may be used with a multiple choice type answer, a true-false type answer, or an answer of the type having more than one proper response to a single question.

These and other objects, advantages and features of the present invention will be more fully set forth in the detailed description which follows.

BRIEF DESCRIPTIONS OF THE DRAWING

In the drawing there are three figures which schematically represent various uses of the presently claimed invention:

DESCRIPTION OF THE PREFERRED EMBODIMENT

Figure 1:
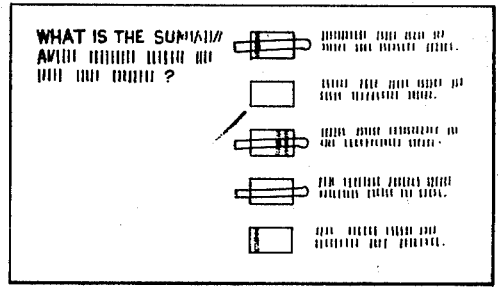
FIG. 1 is a schematic illustration of a worksheet having a single question with a multiple of possible responses, none, any one or all of the responses being correct.

In the detailed description which follows, reference will be made to an invisible ink and also to a visible or writing ink used in a writing or marking instrument. The invisible ink remains invisible until the visible or writing ink is scribed over an area printed with the invisible ink. The reaction of the two inks then results in a visible trace over the invisibly inked area. This visible trace is distinguishable from visible ink markings.

Various features are desirable in such an invisible and visible ink combination. These are more fully set forth in the Skinner et al. applications previously referred to and the application of Ehrlich, Invisible Ink, Ser. No. 634,466, filed Apr. 28, 1967, now Pat. No. 3,438,927. A method for printing the invisible ink on worksheets is disclosed in the application of Niblock, Method of Printing, Ser. No. 646,616, filed June 16, 1967.

Although the disclosures referred to above set forth methods of printing and compositions of inks preferably used with the presently claimed invention, the presently claimed invention is in no way limited to the subject matter of these reference disclosures. Nevertheless an essential feature of the presently claimed invention is the provision of an invisible ink which is activated by a reactant, the reactant being utilized as a visible ink in the student's writing instrument.

Referring now to the figures, there are set forth various embodiments of the presently claimed invention. A feature common to all of the embodiments is that there is a worksheet which includes at least one set of response designations. Response designations are answers or symbols indicating answers which are visibly printed on the worksheet. Symbols may include letters or numbers to indicate a certain response. The response designations thus refer to those proposed responses available to the student in answer to a question. The questions may also be printed on the worksheet or may be presented by some source external the worksheet, such as orally or on a second worksheet.

A visible outline is positioned adjacent each response designation. The outline defines an area in which the student is to mark with a writing or marking instrument. The writing instrument contains visible, activating ink. The student marks only within those outlines corresponding to the response designation(s), i.e. answer(s), which he deems to be proper in response to the question posed to him. Thus a student may be requested to indicate all of those responses he deems correct in answer to a question.

Within the area of the outline of those answers which are, for example, correct there are defined invisible ink markings. These markings consist of, for example, a single vertical line occupying a portion of the area within an outline. With this arrangement, the student is no longer able to precheck his answer and determine whether he is correct. Thus when applying a small dot from the writing instrument within an outline in an effort to precheck his answer, the student cannot be sure that the response of the area within the outline is indicative of a correct or incorrect answer. This results because the invisible ink does not cover the entire area within the outline.

For example, if an outlined area is to contain an invisible ink marking only if that outline is indicative of an answer which is correct, and if the student attempts to cheat by checking that area with a small dot from the end of his writing instrument, the chances are that the dot will not be scribed on the invisibly inked portion of the area. In order for the student to pursue his dishonest intents, he must marks up the entire area within the outline to find the invisible ink marking. Doing this, however, will leave a telltale trace of dots from the marking instrument.

Preferably the correct or "right" answer results in a visible image which is lighter than other color images. Incorrect answers and attempts at cheating are thereby more conspicuous and test papers are easier to grade.

When there is a set of responses for each one of a number of questions on a worksheet, the student may, after a few trial answers, determine that the invisible ink marking is in a certain portion of the area within the outline. He may then attempt to use the "small dot" technique to determine if his answer is correct. In order to circumvent this tactic, the invisible ink marking within the outlines is placed in a different portion of the area within each outline. The student is thus left without any systematic approach for cheating.

The invisible ink, outline and worksheet combination of this invention may be used for any of a number of testing methods. For example, the worksheet may contain a plurality of response designations, 1 through N, each designation corresponding to a single question or statement. A single outline is adjacent each designation. All of those outlines which, for example, indicate a "true" response or answer will include, somewhere within the area of the outline, an invisible ink marking. All of those outlines which are indicative of a "false" answer will contain no invisible ink markings.

The student is then told to mark only those outlined areas in response to questions which he considers have an answer, "false." Immediately, of course, any response which is incorrectly marked is indicated by the invisible ink which has been activated. Since the markings are in different portions of the outlines, the student is foreclosed from any systematic method of checking the outlines to predetermine his answer.

There are, of course, various permutations to the worksheet constructions set forth in the paragraph above. For example, only true or correct answers could be marked. Then if invisible ink is activated, the answer will be known to be correct. Or, for example, each outline may be completely printed with invisible ink, and those outlines which indicate an incorrect or false answer, for example, will have a small portion of the area of the outline which is not invisibly inked. The student will then be requested to draw a line through those outlines which the student deems correct or true, for example. Should the student erroneously draw a line through an answer which is incorrect or false, there will be a gap in the invisible ink response indicating an error in the student's response. Conversely, the gaps could be defined in the correct answer outlines. Then incorrect answers would be immediatly apparent by gaps in the marks scribed by the student.

FIG. 1 illustrates another application of the presently claimed invention. FIG. 1 shows a worksheet with a single question on the left hand side of the worksheet. On the right hand side of the worksheet are a plurality or set of response designations corresponding to the possible responses. Adjacent each one of the response designations is an outline. Within each one of those outlines which indicate a correct response there is an invisible ink marking covering a portion of the area of the outline. All, some or none of the responses may be correct. The invisible ink marking is positioned in a different portion of the area of each outline. Once again this serves to prevent the development of a system of cheating. A student scribing a mark, as indicated by the horizontal lines in FIG. 1, activates the invisibly inked areas as shown in the fig. to provide an immediate check on his answer.

Figure 2:
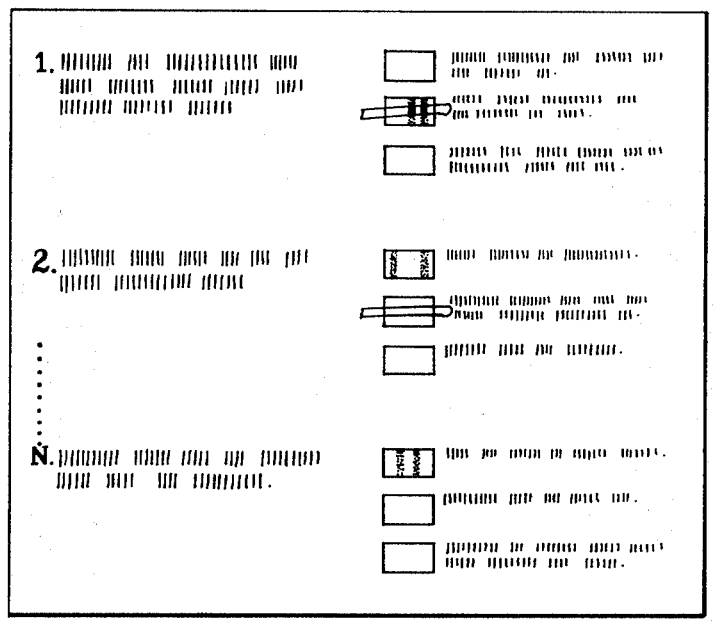
FIG. 2 is a schematic illustration of a worksheet having a plurality of questions, each question having one of a number of possible responses as the correct response.

FIG. 2 represents still another possible arrangement of a worksheet. In FIG. 2 the worksheet contains a plurality of questions aranged in the left hand column. Associated with each question is a plurality or set of response designations indicating the possible responses to each question. These are positioned in the right hand column of the worksheet. An outline is situated adjacent each response designation. Only outlines corresponding to that response or those responses which are correct include a visible ink marking or markings. The arrangement of the marking or markings within the area of the outline is again random to prevent cheating. An example of an activating scribe or line is likewise shown for FIG. 2.

Figure 3:
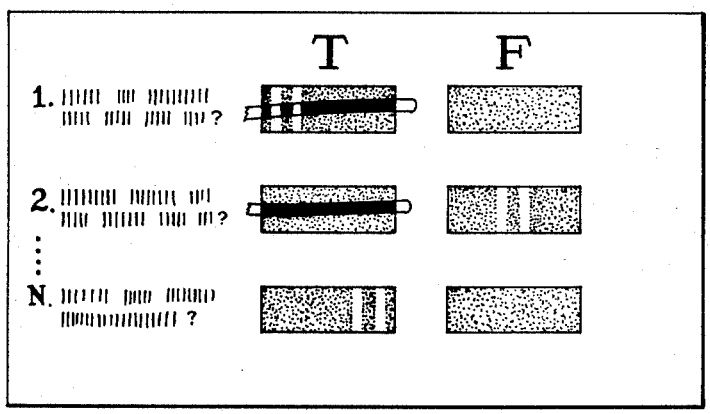
FIG. 3 is a schematic illustration of a worksheet having a plurality of questions, each question having a possible true or false response.

FIG. 3 illustrates yet another possible configuration of a worksheet wherein the outlines are completely filled with invisible ink except for small portion of certain outlines rpresentative of consistent answers. A plurality of questions are set forth in the left hand column of the worksheet. In the right hand column of the worksheet adjacent each question there is a true and a false response designation and associated outline. Those outlines which are indicative of a correct answer have blank spaces in the invisible ink markings. A correct answer is immediately indicated by the absence of activated invisible ink. Analogous to the prior examples, the blank spaces in the nivisible ink are randomly arranged in different portions of the area in each of the outlines to thereby prevent cheating. Example scribes by a student are also indicated in FIG. 3.

In the foregoing description reference has generally been made to placing the invisible ink in the outlines corresponding to correct answers. Of course this may be reversed and the invisible ink markings may be placed in those outlines corresponding to incorrect answers. Further, invisible ink may be printed to fill the entire outline of those response designations which are consistent with one another, for example, only correct answers, and the remaining response designations will then include small portions of the outlined area without invisible ink. Other combinations of questions and response designations are also possible as long as markings are randomly arranged in the outlines and markings (whether the markings result from the visible or the invisible ink) do not fill the entire area of those outlines designating consistent responses Thus while there has been set forth a preferred embodiment of the present invention, it is to be understood that all those embodiments obvious to persons skilled in the art and all those embodiments equivalent to the claimed subject matter are to be included within the scope of the appended claims.

What is claimed is:

1. A teaching device for students comprising, in combination:
   a worksheet;
   means for marking said worksheet visibly;
   a first set of at least two response designations on said worksheet, at least one of said designations signifying a correct response to a first question put to the student;
   outlines on said worksheet, each having a total area enclosed therein, one of said outlines printed adjacent each of said response designations, each of said outlines defining the area in which the student makes a mark with said means for marking said worksheet to thereby indicate those responses the student deems proper; and
   at least one invisible ink marking printed within the area of each of those outlines adjacent those response designations which designate responses consistent with one another, said markings within each of said outlines occupying only a portion of said area, with a portion of said area remaining unprinted with said invisible ink, said markings adapted to become visible upon scribing over said markings by said means for marking said worksheet.

2. The teaching device of claim 1 wherein said proper responses by said student are correct responses to said question and said markings are printed within the area of each of those outlines adjacent correct response designations.

3. The teaching device of claim 1 wherein said invisible ink marking occupies a major portion of the area of said consistent response designation outlines.

4. The teaching device of claim 1 wherein the remaining outlines are completely occupied by invisible ink.

5. The teaching device of claim 1 wherein said invisible ink marking occupies a minor portion of the area of said consistent response designations.

6. The teaching device of claim 1 wherein said outline is rectangularly shaped and said markings comprise at least one vertical line passing through said outline.

7. The teaching device of claim 1 including a plurality of sets of response designations, each set corresponding to a question.

8. The teaching device of claim 7 wherein only one of said response designations in each set is indicative of a proper response.

9. The teaching device of claim 1 wherein at least some of the markings within said outlines are positioned within a different portion of said area of each of said outlines.

10. The teaching device of claim 1 wherein there are only two response designations in each set.

11. A teaching device for students comprising, in combination:
    a worksheet;
    means for marking said worksheet visibly;
    a plurality of response designations, each designation corresponding to a separate question;
    outlines on said worksheet, each having a total area enclosed therein, one of said outlines printed adjacent each of said response designations, each of said outlines defining the area in which the student makes a mark with said means for marking said worksheet to thereby indicate those responses the student deems proper; and
    at least one invisible ink marking printed within the area of each of those outlines adjacent those response designations which designate responses consistent with one another, said markings within each of said outlines occupying only a portion of said area, with a portion of said area remaining unprinted with said invisible ink, said markings adapted to become visible upon scribing over said markings by said means for marking said worksheet.

12. The teaching device of claim 11 wherein said proper responses by said student are correct responses to said question and said markings are printed within the area of each of those outlines adjacent correct response designations.

13. The teaching device of claim 11 wherein said invisible ink marking occupies a major portion of the area of said consistent response designation outlines.

14. The teaching device of claim 11 wherein the remaining outlines are completely occupied by invisible ink.

15. The teaching device of claim 11 wherein said invisible ink marking occupies a minor portion of the area of said consistent response designations.

16. The teaching device of claim 11 wherein sad outline is rectangularly shaped and said markings comprise at least one vertical line passing through said outline.

17. The teaching device of claim 11 wherein at least some of the markings within said outlines are positioned within a different portion of said area of each of said outlines.

References Cited

UNITED STATES PATENTS

| 1,884,197 | 10/1932 | Peterson et al. | 35—9 |
| 3,363,336 | 1/1968 | Skinner | 35—9 X |

EUGENE R. CAPOZIO, Primary Examiner

W. H. GRIEB, Assistant Examiner